(12) United States Patent
Abel et al.

(10) Patent No.: US 9,446,811 B1
(45) Date of Patent: Sep. 20, 2016

(54) SCOOTER

(71) Applicant: Helmut Abel, Maison-Laffitte (FR)

(72) Inventors: Helmut Abel, Maison-Laffitte (FR);
Diane Abel, Maison-Laffitte (FR);
Céline Abel, Maison-Laffitte (FR)

(73) Assignee: Helmut Abel, Maison-Laffitte (FR)

( * ) Notice: Subject to any disclaimer, the term of this patent is extended or adjusted under 35 U.S.C. 154(b) by 0 days.

(21) Appl. No.: 14/743,601

(22) Filed: Jun. 18, 2015

(51) Int. Cl.
*B62K 7/04* (2006.01)
*B62K 3/00* (2006.01)
*B62K 5/00* (2013.01)

(52) U.S. Cl.
CPC ............... *B62K 7/04* (2013.01); *B62K 3/002* (2013.01); *B62K 5/00* (2013.01)

(58) Field of Classification Search
CPC ............ A61H 2003/005; A61H 3/04; A61H 2201/0161; B62B 3/009; B62K 9/02
See application file for complete search history.

(56) References Cited

U.S. PATENT DOCUMENTS

| | | | |
|---|---|---|---|
| 1,288,588 A * | 12/1918 | Holt | B62K 9/02 280/202 |
| 8,201,838 B2 | 6/2012 | Abel | |
| 9,051,019 B2 | 6/2015 | Reck | |
| 2010/0140893 A1 * | 6/2010 | Menefee | A61H 3/04 280/87.041 |

FOREIGN PATENT DOCUMENTS

| | | |
|---|---|---|
| DE | 19849361 | 8/1999 |
| DE | 20019844 | 2/2001 |
| DE | 20309288 | 12/2003 |
| DE | 20316610 | 4/2004 |
| DE | 202007015244 | 4/2008 |
| DE | 102011113226 | 3/2013 |
| EP | 2204315 | 8/2011 |
| FR | 2824518 | 11/2002 |

* cited by examiner

*Primary Examiner* — Bryan Evans

(74) *Attorney, Agent, or Firm* — Akerman LLP; Peter A. Chiabotti

(57) ABSTRACT

A three-wheeled scooter comprising a footboard is disclosed. The scooter can include a steering column with at least one steering wheel being disposed on the front end of the footboard in the direction of travel, and two running wheels being rotatably mounted, spaced apart from one another with parallel axes, on the rear end of the footboard in the direction of travel. A load platform connected to the footboard is provided above the running wheels. The association of the steering column and the load platform with the footboard is asymmetric in such a way that on the one hand when pushing off with his pushing foot the rider can carry out a push-off movement which is not hindered by the load platform and on the other hand the scooter is largely resistant to tipping both during the pushing off and also during the travel phase even when traveling around curves.

15 Claims, 4 Drawing Sheets

SCOOTER

BACKGROUND

This application relates to a scooter.

A scooter is understood to be a muscle-powered, generally two-wheeled small vehicle with a footboard which is close to the ground and on which a person standing can travel along. In this case the person stands with one foot on the footboard, whilst the scooter is propelled by pushing movements of the other foot, the pushing foot.

Such a scooter is illustrated for example in DE 200 19 844 U1. This scooter, called a City-Roller, is equipped with a transport container which is attached to the handlebar of the steering column. Such a transport container makes the scooter top-heavy and, moreover, hinders the rider.

DE 20 2007 015 244 U1 discloses a three-wheeled scooter which is comparatively stable because of its running wheels which are disposed axially parallel at the rear end and spaced apart from one another. In the case of this scooter the rider stands with both feet on a footboard which is disposed between the rear wheels but the positioning of which renders it difficult to propel the scooter by means of the pushing foot.

A more favorable configuration is that of a three-wheeled scooter according to EP 2 204 315 B1, in which a narrow footboard is placed between arms on both sides which support the rear running wheels, so that between the footboard and the arms a free space is produced into which the rider's pushing foot can move in order to propel the scooter forwards. This scooter is equipped with a goods transport container, but this is disadvantageously likewise disposed in the front region of the scooter behind the steering column, which inevitably limits its volume and its load-carrying capacity.

Finally, electric motor-powered three-wheeled scooters are commercially available, in which a goods receptacle with a large surface area is connected to the rear end of the footboard and can receive larger and heavier goods to be transported. Although in this scooter the load distribution is favorable, this design is not suitable for a muscle-powered scooter, since the goods receptacle located at the rear makes it impossible for the rider to propel the scooter by pushing off with the foot.

DE 198 49 361 A1 discloses a scooter with a goods transport receptacle which is disposed on the rear part of the footboard symmetrically between two rear running wheels. With this construction the pushing foot cannot carry out any unhindered pushing movements because of the outwardly projecting rear running wheels, since it can knock against the rear running wheels which project further outwards.

In another variant shown in this document a goods transport receptacle is disposed laterally on the footboard and is provided with a supporting wheel to support the receptacle. This lateral goods transport receptacle does indeed facilitate the transport of cumbersome goods. However, the supporting wheel hinders correct curved travel of the scooter, since in this case the supporting wheel in the vertical oblique position scrapes over the ground and thereby wears quickly and brakes the scooter.

DE 20 309 288 U1 likewise describes a scooter having a goods transport receptacle which is disposed laterally on the footboard and is supported by a supporting wheel and which has the same disadvantages explained above.

Receptacles for goods to be transported which are disposed laterally on the footboard, that is to say adjacent to the pushing foot, also have the disadvantage that the pushing foot working far outside must push the scooter with the loaded goods transport receptacle forwards, which leads to the scooter having a tendency towards unwanted curved travel.

SUMMARY

The object of the present disclosure, starting from the described prior art, is to create a scooter according to the features and structures recited herein, which does not have the disadvantages described above, i.e. in particular which is equipped with a large goods transport container having a high load-carrying capacity, but which does not affect the tipping stability of the scooter.

This object is achieved by a scooter having the features and structures recited herein which lead to an asymmetric design of the scooter, of which the laterally offset load platform allows the transport of bulky goods, without impairing the stability of the scooter in travel mode.

Since according to the present disclosure, the goods transport receptacle is provided behind the footboard and thus behind the pushing foot, the scooter is propelled forwards by the pushing foot, so that the scooter remains on the desired path.

Advantageous embodiments and refinements are specified in the further features and structures recited herein.

BRIEF DESCRIPTION OF THE DRAWINGS

The subject matter of the present disclosure is explained in detail with reference to an embodiment which is illustrated in the drawings. In the schematic drawings.

Figure 1:
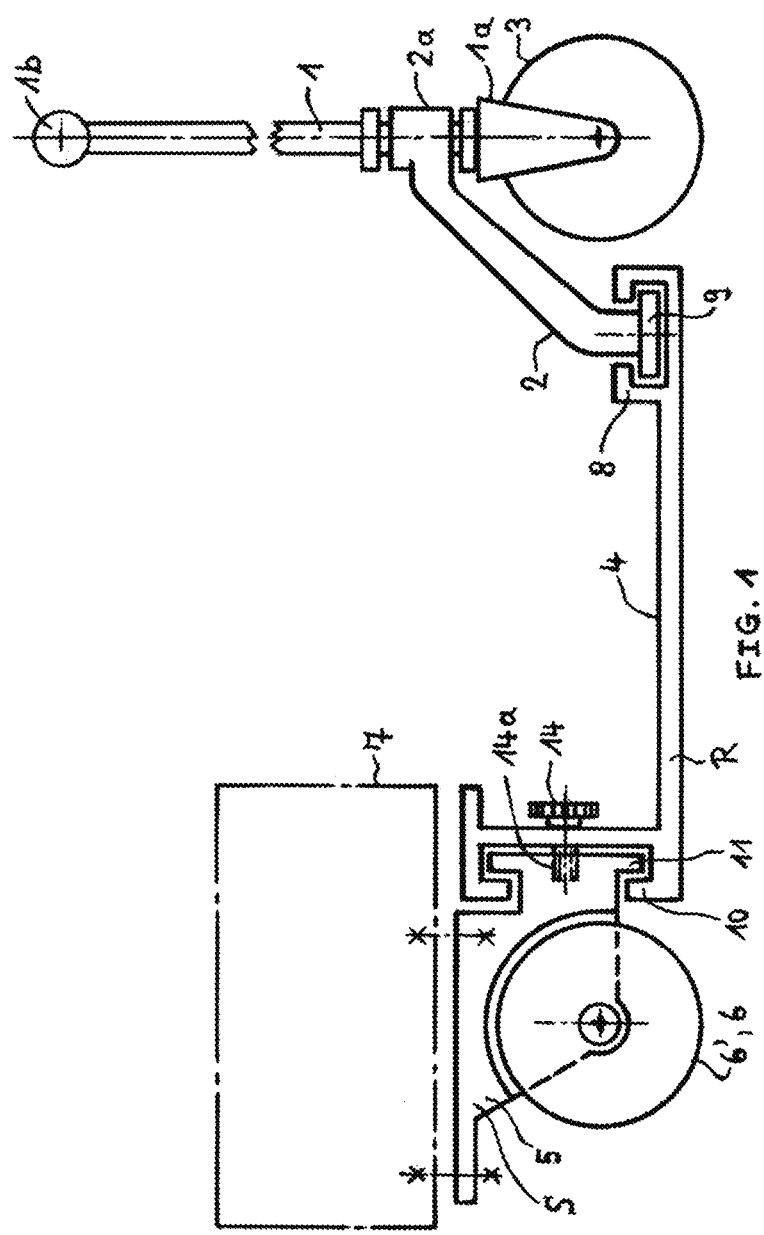
FIG. 1 shows a side view of the according to one embodiment of a three-wheeled scooter, viewed from the right in the direction of travel.
Figure 2:
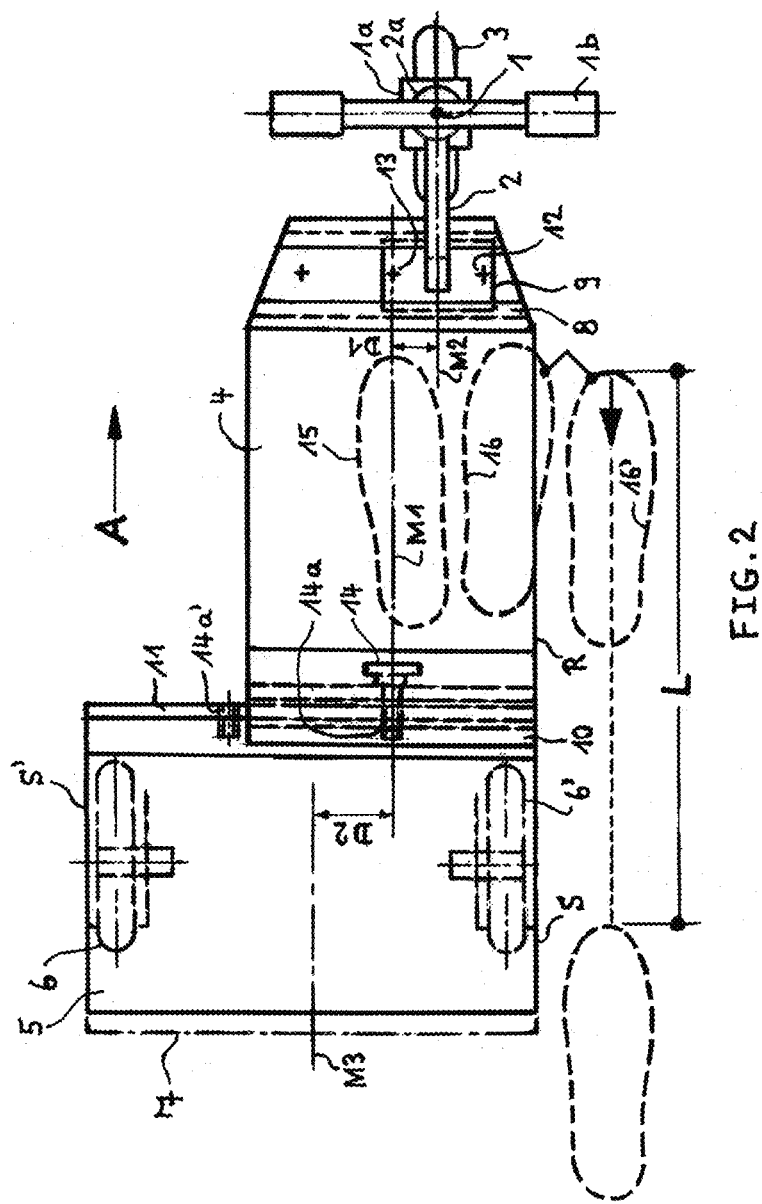
FIG. 2 shows a plan view of the scooter according to FIG. 1 with indicated foot positions or movements of the rider.

The basic structure of the scooter can be seen from FIGS. 1 and 2.

DETAILED DESCRIPTION OF THE ILLUSTRATED EMBODIMENT

This scooter has a comparatively narrow footboard 4 in the central region, and by means of a retaining arm 2 the steering column 1 with a wheel fork 1a supporting the steering wheel 3 and with a connecting member 1b is disposed at the front end of said region. A bearing bushing 2a located at the front in the direction of travel accommodates the steering column 1 in a rotatable manner. The rear end of the steering column retaining arm 2 has a fastening head 9 which is located so as to be transversely movable in a dovetailed fixing rail 8 and can be secured by locking screws 12 and 13.

Two running wheels 6 and 6' disposed at a greater spacing from one another as well as a load platform 5 disposed above the running wheels to receive a goods transport container 7 are located at the rear end of the footboard 4. The load platform 5 is connected, like the steering column retaining arm 2, to the footboard 4 by means of a fastening head 11 in a dovetail-shaped fixing rail so as to be transversely movable. The connection takes place by means of a spindle screw 14, which can be screwed alternatively into threaded holes 14*a* or 14*a*' in the load platform.

The asymmetric structure which is typical for the scooter, according to the present disclosure, may be explained initially with reference to FIG. 2.

The goods transport receptacle designed in the form of a load platform 5 with its center line M3 is offset laterally with respect to the center line M1 of the footboard 4 by the distance D2 in such a way that the outer surface S of the load platform 5 is flush with the outer edge R of the footboard 4. By this means a free space is created for the right pushing foot 16, 16', which when the scooter moves in the direction of the arrow A can produce, completely unhindered, a vigorous and also very long push-off of the foot L, without colliding with the load platform 5 and the goods transport container 7 located there.

Also the steering column 1 with its steering column retaining arm 2, the center line of which is designated by M2, is offset laterally with respect to the center line M1 of the footboard 4 by the distance D1 which, like the offset D2 of the load platform 5, contributes to the stability of the scooter when it is moving in the direction of the arrow A and ensures a comfortable position for the rider who is supported with his left foot 15 on the footboard 4. As is explained below with reference to FIG. 4, the eccentric arrangement of the running wheels 6 and 6' below the load platform 5 close to the lateral outer surfaces S and S' is important for the tipping stability both during the push-off phase and also during the travel phase.

The scooter illustrated in plan view in FIG. 2 is set for "right-footers", i.e. for riders who always use only the right foot for pushing off.

The releasable connection of the load platform 5 as well as the steering column retaining arm 2 to the footboard 4 enables a simple and quick conversion of the scooter for "left-footers".

Figure 3:
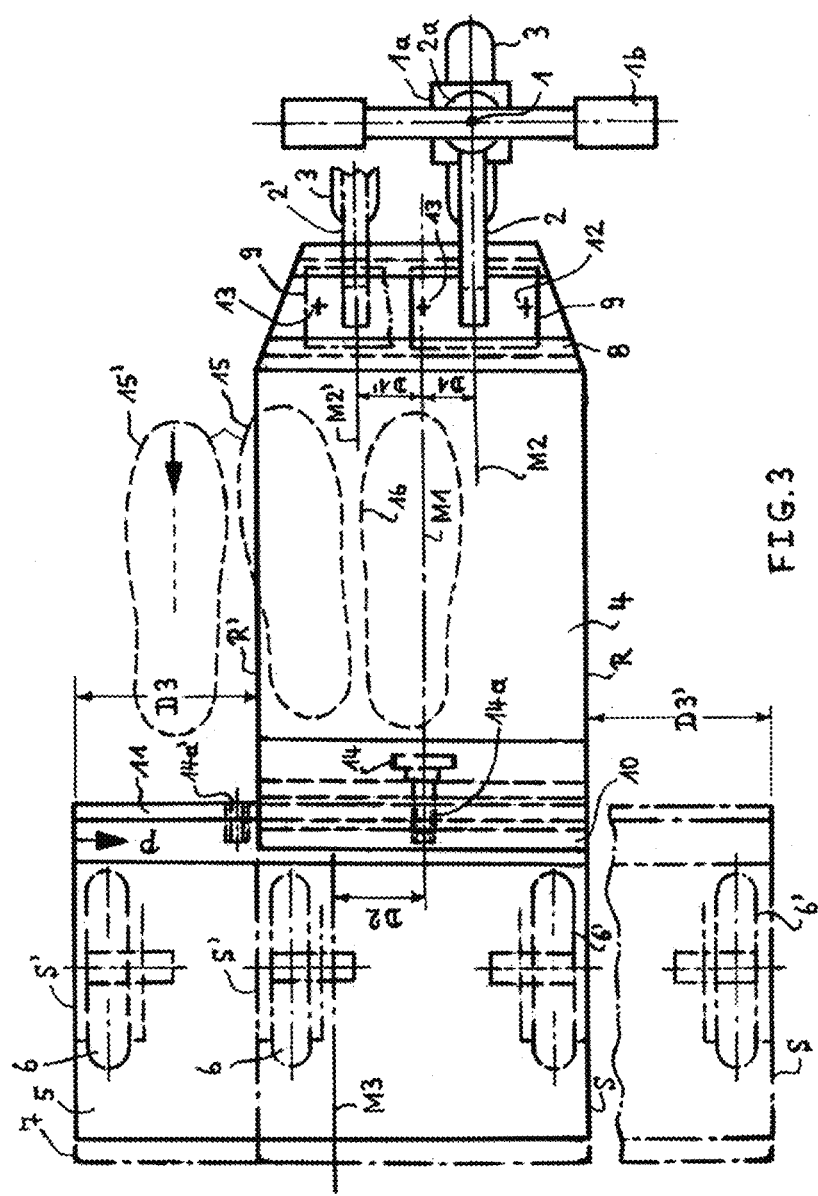
FIG. 3 shows a plan view of the scooter according to FIG. 1 with additional illustrations to show the transverse shifting of the load platform and the steering column with the steering column retaining arm.

As illustrated by FIG. 3, after release of the two locking screws 12, 13 when viewed in the direction of travel the steering column 1 can be shifted towards the left by the distance D1+D1' into the position located at the left, which is illustrated by the center line M2' of the retaining arm 2. After this shifting operation the fastening head 9 of the steering column retaining arm 2 should be screwed on again in order to secure it against lateral displacement.

Furthermore, after release of the spindle screw 14 the load platform 5 when viewed in the direction of travel should be shifted to the right by the distance D3, so that now the outer surface S' of the load platform 5 is flush with the outer edge R' of the footboard 4 located on the left in the direction of travel. The side of the load platform 5 located on the right in the direction of travel is shifted by the distance D3'. The load platform 5 is subsequently fixed by means of the spindle screw 14 which is to be inserted into the threaded hole 14'*a*. By this means, in similar manner to that explained with reference to FIG. 2, space is created for a long push-off movement of the left foot out of the position 15'. Unlike the arrangement according to FIG. 4, the rider's right foot 16 is now the supporting foot, which remains behind the steering column 1 on the footboard 4 during the push-off movement of the pushing foot 15'.

The great tipping stability of the scooter according to the present disclosure is explained with reference to FIG. 4 in a schematic representation of the plan view of FIG. 2.

After each push-off operation the rider, in this case a "right-footer", puts his pushing foot 16 next to his supporting foot 15 on the footboard 4 in order to travel comfortably and safely thereon. Even when traveling fast around curves this scooter remains completely stable against tilting for the following reasons.

Figure 4:
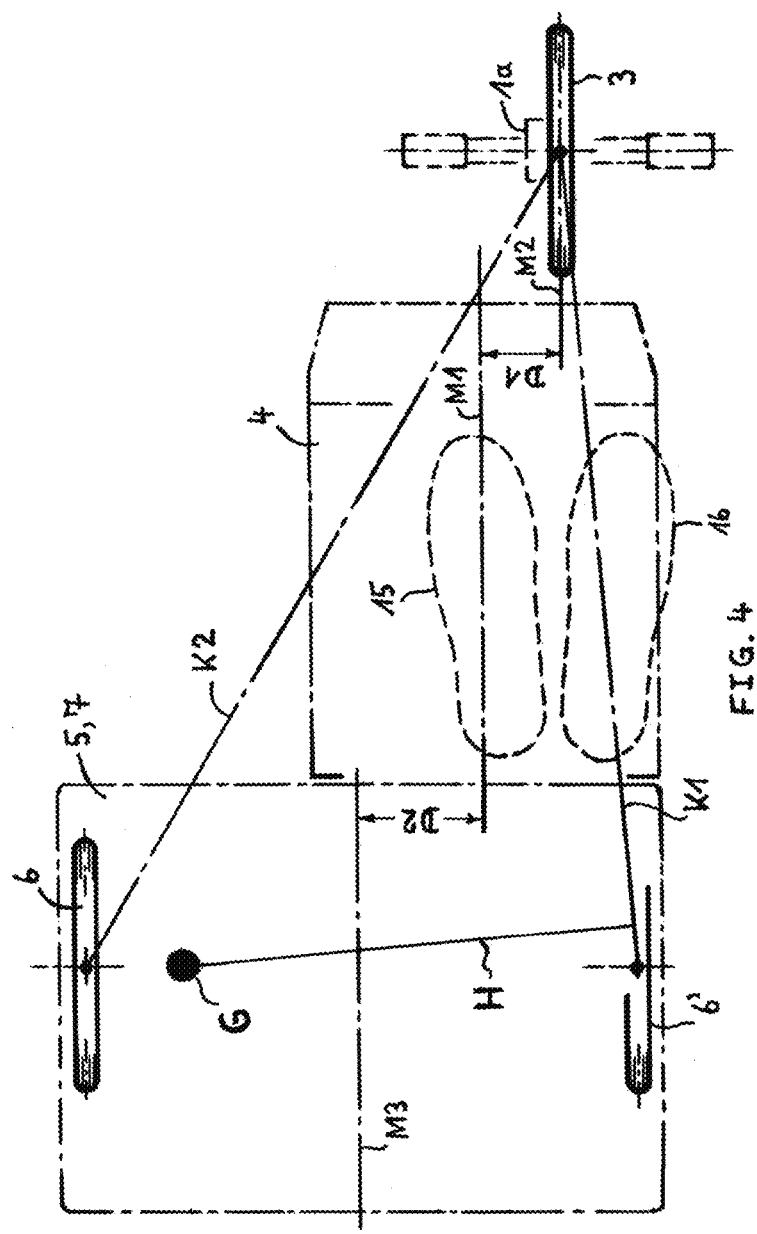
FIG. 4 shows a schematic representation of the view according to FIG. 2 for illustration of the loading conditions.

In the representation according to FIG. 4 the following lines and points are shown for the purpose of explanation.

The connection between the steering wheel 3 and the rear wheel 6' on the right here is designated as the tipping line K1. The connecting line between the steering wheel 3 and the left rear wheel 6 is designated as the tipping line K2.

The distance of the center of gravity G of the load platform 5 with the goods transport container 7 from the tipping line K1 is defined by the line H.

This results in the following loading conditions.

The rider's supporting foot 15, which is always more heavily loaded, is always located between the two tipping lines K1 and K2 and gives the scooter full contact with the path surface.

The generally less heavily loaded pushing foot 16 which is in the rest position here is placed above the tipping line K1 but on the one hand because of insufficient leverage cannot cause the scooter to tip over in the direction of travel towards the right. On the other hand it also cannot counteract the weight, symbolized by the center of gravity G, of the outwardly projecting section of the load platform 5 with the goods transport container 7, since because of the long lever arm H the weight acting at the point G completely prevents the scooter from tipping over towards the right over the tipping line K1. Tipping of the scooter over the line K2 towards the left, in particular when the goods transport container 7 is laden, is almost impossible.

It will be understood that the concept the according to the present disclosure can also be implemented in another way. In a manner which is known per se the components of the scooter can be reinforced in particular for industrial applications or can be connected to a chassis of larger dimensions.

In the case of higher loads, twin wheels having a high load-carrying capacity can be used instead of the single wheels.

Also the fixed or variable connection of the steering column or the load platform with the footboard can be implemented in another way.

LIST OF REFERENCE SIGNS a. steering column
1*a* wheel fork
1*b* handlebar
2 steering column retaining arm
2*a* bearing bushing
3 steering wheel
4 footboard
5 load platform
6, 6' rear running wheels
7 goods transport container
8, 10 dovetailed fixing rails
9, 11 fastening head
12, 13 locking screws
14 locking screw in the form of a spindle screw
14*a*, 14*a*' threaded hole
15, 15' rider's left foot
16, 16' rider's right foot
A direction of movement of the scooter
M1 center line of the footboard 4
M2 center line of the steering column retaining arm 2
M3 center line of the load platform 5
R, R' outer edge of the footboard 4

S, S' outer surface of the load platform 5
P directional arrow
L length of the push
H lever arm
G center of gravity of the outwardly projecting section of the goods transport receptacle 5 with goods transport container 7
K1, K2 tipping line
D1, D1' offset of the steering column 1
D2, D3, D3' offset of the load platform 5

The invention claimed is:

1. A scooter, comprising:
a footboard which is close to the ground and has a front end in a direction of travel and a rear end opposite the front end;
a steering column with a steering wheel being disposed rotatably on and directly to the front end of the footboard in the direction of travel;
running wheels being rotatably mounted, spaced apart from one another with parallel axes, on the rear end of the footboard;
a goods transport receptacle comprising a load platform that is offset laterally with respect to the footboard and is connected directly to the rear end of the footboard, wherein an outer surface of the load platform, which is adjacent to a rider's pushing foot position, is flush with an outer edge of the footboard, and
wherein an opposing outer surface of the load platform is located at a greater distance from the footboard, and the rear running wheels, in each case, being disposed close to, respectively, the outer surface of the load platform and the opposing outer surface of the load platform, and under the load platform.

2. The scooter according to claim 1, wherein a distance of a footboard center line from the opposing outer surface of the load platform is greater than a distance of the footboard center line from the outer edge of the footboard and the outer surface of the load platform.

3. The scooter according to claim 1, wherein a center of gravity of an outwardly projecting section of the load platform with the goods transport receptacle is located close to a rear running wheel of the running wheels.

4. The scooter according to claim 1, wherein the steering column has a retaining arm, and the steering column and steering column retaining arm can be moved transversely with respect to the footboard.

5. The scooter according to claim 4, wherein the steering column retaining arm is connected to the footboard by dovetailed fixing rails and can be locked by locking screws.

6. The scooter according to claim 4, wherein steering column retaining arm comprises a steering column retaining arm front end in the direction of travel and a steering column retaining arm rear end, wherein the steering column retaining arm front end has a bearing bushing for the steering column and the steering column retaining arm rear end has a fastening head connection to the footboard.

7. The scooter according to claim 4, a fastening head located on a front end of the load platform and which engages in a dovetailed fixing rail.

8. The scooter according to claim 1, wherein the running wheels are twin wheels.

9. The scooter according to claim 1, wherein the load platform can be moved transversely with respect to the footboard.

10. The scooter according to claim 9, wherein the load platform is connected to the footboard by dovetailed fixing rails and can be locked by locking screws.

11. The scooter according to claim 6, wherein the fastening head connection is releasable.

12. A scooter, comprising:
a footboard having a footboard front end in a direction of travel, an opposing footboard rear end, a footboard width and a footboard centerline running lengthwise in the direction of travel;
a steering column having a steering wheel;
a steering column retaining arm coupling the steering column directly to the footboard front end;
running wheels extending from the footboard rear end;
a load platform connected directly to the footboard, the load platform having a load platform centerline running lengthwise in the direction of travel, the load platform having a first outer load platform surface that is flush with a first outer footboard surface, the load platform having a second opposing outer load platform surface, wherein the second opposing outer load platform surface extends beyond the footboard width;
wherein one running wheel of the rear running wheels is located adjacent to the first outer load platform surface and below the load platform, and one running wheel of the rear running wheels is located adjacent to the second opposing outer load platform surface, beyond the footboard width and under the load platform.

13. The scooter of claim 12, wherein the load platform centerline is substantially parallel to and orthogonally offset from the footboard centerline.

14. The scooter of claim 12, wherein the steering wheel is offset from the footboard centerline.

15. The scooter of claim 12, wherein a distance from the footboard centerline to the second opposing outer load platform surface is greater than a distance from the footboard centerline to the first outer load platform surface, and greater than a distance from the footboard centerline to the first outer footboard surface.

* * * * *